UNITED STATES PATENT OFFICE.

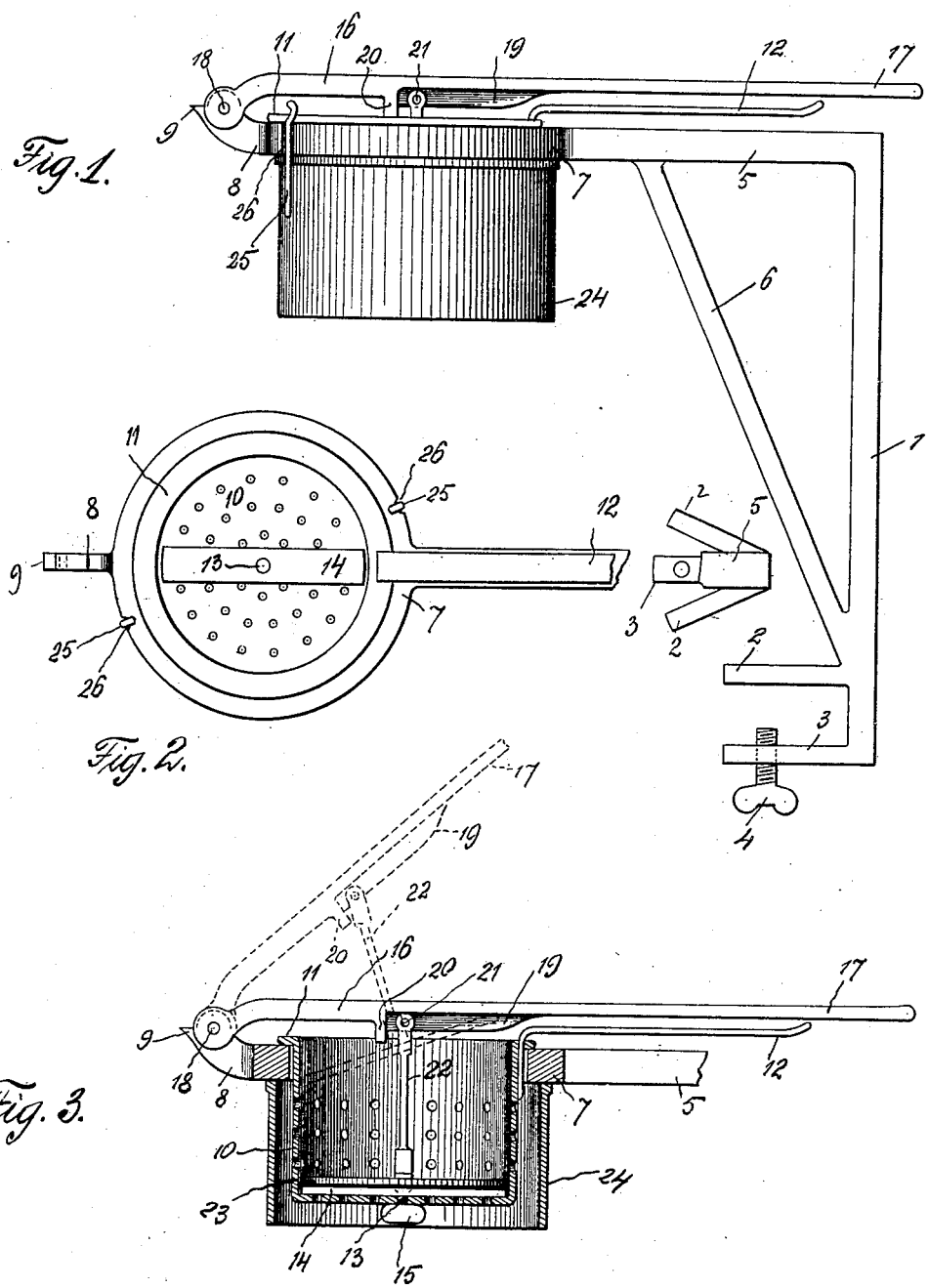

FRANCIS M. BECKER AND EDWARD J. ONDRIZEK, OF LATROBE, PENNSYLVANIA.

FRUIT AND LARD PRESS.

No. 930,130.  Specification of Letters Patent.  Patented Aug. 3, 1909.

Application filed December 17, 1908. Serial No. 468,067.

*To all whom it may concern:*

Be it known that we, FRANCIS M. BECKER and EDWARD J. ONDRIZEK, citizens of the United States of America, residing at Latrobe, in the county of Westmoreland and State of Pennsylvania, have invented certain new and useful Improvements in Fruit and Lard Presses, of which the following is a specification, reference being had therein to the accompanying drawing.

This invention relates to a fruit and lard press for culinary purposes, and the primary object of our invention is to provide simple and effective means for extracting the juice or syrup from fruit, and for pressing, mashing and disintegrating vegetables and similar matter.

Another object of this invention is to provide a novel support for a colander and to equip the colander with a scraper, whereby the bottom of said colander can be easily cleaned.

A further object of our invention is the provision of novel means in connection with a colander for preventing juice and syrup extracted from fruit from splashing upon the operator or articles in vicinity of the press.

A still further object of this invention is to provide a simple, durable and inexpensive press that can be easily attached to a kitchen table or similar support and easily operated.

With the above and other objects in view which will more readily appear as the invention is better understood, the same consists in the novel construction, combination and arrangement of parts to be hereinafter described and claimed.

Referring to the drawings:—Figure 1 is a side elevation of the fruit and lard press, Fig. 2 is a plan of a portion of the same, and Fig. 3 is a cross sectional view of a portion of the fruit and lard press.

In the accompanying drawings, 1 designates a bracket having the lower end thereof provided with two parallel lugs 2 and 3, the former being V-shaped to provide a positive grip, while the latter is provided with a set screw 4 capable of being adjusted to clamp the lug 2 upon a table or similar support (not shown) for holding the bracket 1 in a vertical position. The horizontal portion 5 of the bracket is braced by an angular arm 6 and the horizontal portion 5 supports an annulus or ring 7. The said annulus or ring diametrically the horizontal portion 5 is provided with an apertured lug 8 having a shoulder 9 for a purpose that will presently appear.

Adapted to fit in the annulus or ring 7 is a colander or apertured receptacle 10 having the upper edge thereof reamed or provided with a peripheral flange 11 adapted to rest upon the annulus or ring 7 for supporting the colander or receptacle 10 therein. This colander or apertured receptacle is provided with a suitable handle 12.

Centrally in the bottom of the colander or apertured receptacle 10 is journaled a pin 13 and upon the inner end of the pin is fixed a scraper 14, while upon the outer end of said pin is fixed a button 15. By rotating the button 15, the scraper can be revolved within the colander to prevent matter from adhering to the bottom of the colander.

Pivotally connected to the apertured lug 8 is a lever 16 having a suitable handle 17. This lever is bifurcated and fits down over the lug 9 and is held in engagement therewith by a pivot pin 18. The lever 16 is provided with a depending web 19 and a depending lug 20. Pivotally connected to the web 19 by a pivot pin 21 is the bifurcated end of an arm 22, the lower end of said arm supporting a circular disk or head 23. Detachably connected to the annulus or ring 7 is a cylindrical shield 24 adapted to surround the colander. The upper edges of this shield are provided with oppositely disposed resilient clasps 25 for engaging in vertical grooves 26 formed in the periphery of the annulus or ring.

To operate the press, the matter to be pressed, mashed or disintegrated is placed in the colander and the lever 16 vertically reciprocated. The lever 16 is limited in its vertical or rearward movement by the lug 9 and when supported by said lug, the colander can be removed.

The entire device is made of light and durable metal, and while in the drawings there is illustrated the preferred embodiments of our invention, we reserve the right to make various changes without departing from the scope of the invention.

Having now described our invention what we claim as new, is:—

1. In a press of the type described comprising a bracket, an annulus carried thereby, a colander detachably supported by said annulus, a scraper revolubly mounted in the bottom of said colander, a lever pivotally connected to said annulus, an arm pivotally connected to said lever and adapted to extend into said colander, a head carried by the lower end of said arm, a shield detachably secured to said annulus, and means for limiting the rearward movement of said lever.

2. A press of the type described comprising a bracket, a colander supported thereby, a lever pivotally connected to said bracket and adapted to extend over the colander, a head pivotally attached to the lever and adapted to extend in said colander, a scraper revolubly mounted upon the bottom of the colander, and means arranged exteriorly of the bottom of the colander and connected to the scraper for operating the same.

In testimony whereof we affix our signatures in the presence of two witnesses.

FRANCIS M. BECKER.
EDWARD J. ONDRIZEK.

Witnesses:
V. T. ALBERT,
C. C. ALBERT.